United States Patent
Qian et al.

(10) Patent No.: US 10,699,700 B2
(45) Date of Patent: Jun. 30, 2020

(54) MONAURAL MULTI-TALKER SPEECH RECOGNITION WITH ATTENTION MECHANISM AND GATED CONVOLUTIONAL NETWORKS

(71) Applicant: TENCENT TECHNOLOGY (SHENZHEN) COMPANY LIMITED, Shenzhen, Guangdong (CN)

(72) Inventors: Yanmin Qian, Shanghai (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 151 days.

(21) Appl. No.: 16/050,825

(22) Filed: Jul. 31, 2018

(65) Prior Publication Data
US 2020/0043467 A1    Feb. 6, 2020

(51) Int. Cl.
| | | |
|---|---|---|
| G10L 15/06 | (2013.01) | |
| G10L 15/20 | (2006.01) | |
| G06N 5/04 | (2006.01) | |
| G10L 21/0308 | (2013.01) | |
| G06N 3/08 | (2006.01) | |
| G10L 25/30 | (2013.01) | |

(52) U.S. Cl.
CPC ............ *G10L 15/063* (2013.01); *G06N 3/08* (2013.01); *G06N 5/046* (2013.01); *G10L 15/20* (2013.01); *G10L 21/0308* (2013.01); *G10L 25/30* (2013.01)

(58) Field of Classification Search
CPC ... G10L 15/063; G10L 15/20; G10L 21/0308; G10L 25/30
See application file for complete search history.

(56) References Cited

U.S. PATENT DOCUMENTS

| | | | |
|---|---|---|---|
| 10,347,241 B1 * | 7/2019 | Meng | G10L 15/16 |
| 2009/0306987 A1 | 12/2009 | Nakano et al. | |
| 2015/0269933 A1 * | 9/2015 | Yu | G10L 25/90 |
| | | | 704/232 |

(Continued)

FOREIGN PATENT DOCUMENTS

| | | |
|---|---|---|
| CN | 105321518 A | 2/2016 |
| CN | 106062786 A | 10/2016 |
| JP | 2007-298876 A | 11/2007 |

OTHER PUBLICATIONS

Yu, Dong, Xuankai Chang, and Yanmin Qian. "Recognizing multi-talker speech with permutation invariant training." arXiv preprint arXiv:1704.01985 (2017). (Year: 2017).*

(Continued)

*Primary Examiner* — Brian L Albertalli
(74) *Attorney, Agent, or Firm* — Sughrue Mion, PLLC

(57) ABSTRACT

Provided are a speech recognition training processing method and an apparatus including the same. The speech recognition training processing method includes acquiring multi-talker mixed speech sequence data corresponding to a plurality of speakers, encoding the multi-speaker mixed speech sequence data into an embedded sequence data, generating speaker specific context vectors at each frame based on the embedded sequence, generating senone posteriors for each of the speaker based on the speaker specific context vectors and updating an acoustic model by performing permutation invariant training (PIT) model training based on the senone posteriors.

17 Claims, 8 Drawing Sheets

(56) References Cited

U.S. PATENT DOCUMENTS

| | | | | |
|---|---|---|---|---|
| 2017/0337924 | A1 | 11/2017 | Yu | |
| 2018/0254040 | A1* | 9/2018 | Droppo | G10L 17/18 |
| 2019/0304437 | A1* | 10/2019 | Qian | G10L 15/063 |
| 2019/0304438 | A1* | 10/2019 | Qian | G10L 15/07 |

OTHER PUBLICATIONS

Li, Li, and Hirokazu Kameoka. "Deep clustering with gated convolutional networks." 2018 IEEE International Conference on Acoustics, Speech and Signal Processing (ICASSP). IEEE, 2018. (Year: 2018).*
Luo, Yi, and Nima Mesgarani. "Tasnet: time-domain audio separation network for real-time, single-channel speech separation." 2018 IEEE International Conference on Acoustics, Speech and Signal Processing (ICASSP). IEEE, 2018. (Year: 2018).*
Geoffrey Hinton et al., "Deep Neural Networks for Acoustic Modeling in Speech Recognition", IEEE Signal Processing Magazine, vol. 29, pp. 82-97, Apr. 27, 2012, 27 pages total.
Tara N. Sainath et al., "Deep Convolutional Neural Networks for LVCSR", IEEE International Conference on Acoustics, Speech and Signal Processing (ICASSP), 2013, pp. 8614-8618, 5 pages total.
Dong Yu et al., "Deep Convolutional Neural Networks with Layerwise Context Expansion and Attention", Annual Conference of International Speech Communication Association (INTERSPEECH), 2016, pp. 17-21, 5 pages total.
Ossama Abdel-Hamid et al., "Exploring Convolutional Neural Network Structures and Optimization Techniques for Speech Recognition", Annual Conference of International Speech Communication Association (INTERSPEECH), 2013, pp. 3366-3370, 5 pages total.
Tara N. Sainath et al., "Convolutional, Long Short-Term Memory, Fully Connected Deep Neural Networks", IEEE International Conference on Acoustics, Speech and Signal Processing (ICASSP), 2015, pp. 4580-4584, 5 pages total.
Mengxiao Bi et al., "Very Deep Convolutional Neural Networks for LVCSR", Annual Conference of International Speech Communication Association (INTERSPEECH), 2015, pp. 3259-3263, 5 pages total.
Yanmin Qian et al. "Very Deep Convolutional Neural Networks for Noise Robust Speech Recognition", IEEE/ACM Transactions on Audio, Speech, and Language Processing (TASLP), vol. 24, No. 12, pp. 2263-2276, 2016, 60 pages total.
W. Xiong et al., "The Microsoft 2016 Conversational Speech Recognition System", IEEE International Conference on Acoustics, Speech and Signal processing (ICASSP), 2017, pp. 5255-5259, 5 pages total.
Yanmin Qian et al., "Noise Robust Speech Recognition on Aurora4 by Humans and Machines", IEEE International Conference on Acoustics, Speech and Signal Processing (ICASSP), 2018, pp. 5604-5608, 5 pages total.
Tian Tan et al., "Adaptive very deep convolutional residual network for noise robust speech recognition", IEEE/ACM Transactions on Audio, Speech, and Language Processing (TASLP), 2018, 12 pages total.
Chao Weng et al., "Deep Neural Networks for Single-Channel Multi-Talker Speech Recognition", IEEE/ACM Transactions on Audio, Speech, and Language Processing (TASLP), vol. 23, No. 10, pp. 1670-1679, 2015, 10 pages total.
Hershey, J.R. et al., "Deep clustering: Discriminative embeddings for segmentation and separation", IEEE International Conference on Acoustics, Speech and Signal Processing (ICASSP), Mar. 2016, pp. 31-35, 7 pages total.
Isik, Y. et al., "Single-Channel Multi-Speaker Separation using Deep Clustering", Annual Conference of International Speech Communication Association (INTERSPEECH), 2016, pp. 545-549, 7 pages total.
Zhuo Chen et al., "Deep Attractor Network for Single-Microphone Speaker Separation", IEEE International Conference on Acoustics, Speech and Signal Processing (ICASSP), 2017, pp. 246-250, 5 pages total.
Dong Yu et al., "Permutation Invariant Training of Deep Models for Speaker-Independent Multi-Talker Speech Separation", IEEE International Conference on Acoustics, Speech and Signal Processing (ICASSP), 2017, pp. 241-245, 5 pages total.
Morten Kolbæk et al., "Multi-talker Speech Separation with Utterance-level Permutation Invariant Training of Deep Recurrent Neural Networks", IEEE/ACM Transactions on Audio, Speech, and Language Processing (TASLP), vol. 25, No. 10, pp. 1901-1913, 2017, 12 pages total.
Dong Yu et al., "Recognizing Multi-talker Speech with Permutation Invariant Training", Annual Conference of International Speech Communication Association (INTERSPEECH), Aug. 2017, pp. 2456-2460, 5 pages total.
Yanmin Qian et al., "Single-Channel Multi-talker Speech Recognition with Permutation Invariant Training", IEEE/ACM Transactions on Audio, Speech, and Language Processing, Speech Communication,arXiv preprint arXiv:1707.06527, 2017, 11 pages total.
Xuankai Chang et al., "Adaptive Permutation Invariant Training With Auxiliary Information for Monaural Multi-Talker Speech Recognition", IEEE International Conference on Acoustics, Speech and Signal Processing (ICASSP), 2018, 5 pages total.
Tian Tan et al., "Knowledge Transfer in Permutation Invariant Training for Single-Channel Multi-Talker Speech Recognition", IEEE International Conference on Acoustics, Speech and Signal Processing (ICASSP), 2018, 5 pages total.
Zhehuai Chen et al., "Sequence Modeling in Unsupervised Single-Channel Overlapped Speech Recognition", IEEE International Conference on Acoustics, Speech and Signal Processing (ICASSP), 2018, 5 pages total.
Zhehuai Chen et al., "Progressive Joint Modeling in Unsupervised Single-channel Overlapped Speech Recognition", IEEE/ACM Transactions on Audio, Speech, and Language Processing (TASLP), vol. 26, No. 1, pp. 184-196, Jan. 2018, 14 pages total.
Dzmitry Bandanau et al., "Neural Machine Translation by Jointly Learning to Align and Translate", International Conference on Learning Representations (ICLR), 2015, 15 pages total.
Minh-Thang Luong et al., "Effective Approaches to Attention-based Neural Machine Translation", arXiv preprint arXiv:1508.04025, 2015, pp. 1412-1421,10 pages total.
William Chan et al., "Listen, Attend and Spell", A neural network for large vocabulary conversational speech recognition, IEEE International Conference on Acoustics, Speech and Signal Processing (ICASSP), 2016, pp. 4960-4964, 16 pages total.
Jan Chorowski et al., "Attention-Based Models for Speech Recognition", Annual Conference on Neural Information Processing Systems (NIPS), 2015, pp. 577-585, 9 pages total.
Yann N. Dauphin et al., "Language Modeling with Gated Convolutional Networks", arXiv preprint arXiv:1612.08083, 2016, 9 pages total.
Yong Xu et al., "Large-Scale Weakly Supervised Audio Classification Using Gated Convolutional Neural Network", arXiv preprint arXiv:1710.00343, 2017, 5 pages total.
Daniel Povey et al., "The Kaldi Speech Recognition Toolkit", IEEE Workshop on Automatic Speech Recognition and Understanding (ASRU), 2011, 4 pages total.
Adam Paszke et al., "Automatic differentiation in PyTorch", 31st Conference on Neural Information Processing Systems (NIPS 2017), Long Beach, CA, USA, 2017, 4 pages total.
Dong Yu et al., "Automatic Speech Recognition: A Deep Learning Approach", Signals and Communication Technology, Springer London, 2014, 329 pages total.
Cory Stephenson et al., "Monaural Audio Speaker Separation Using Source-Contrastive Estimation", 2017 IEEE, Dec. 2017, 7 pages total.
International Search Report and Written Opinion dated Aug. 9, 2019 issued by the International Searching Authority in International Application No. PCT/CN2019/086387.

(56) References Cited

OTHER PUBLICATIONS

Nishi et al., "Multimodal-i-vectors for Speaker Diarization", SIG Technical Report, vol. 2015-SLP-107, No. 4, Jul. 17, 2015, 7 pages total.
Notice of Reasons for Rejection dated Aug. 6, 2019 issued by the Japanese Patent Office in counterpart Application No. 2018-552112.

* cited by examiner

MONAURAL MULTI-TALKER SPEECH RECOGNITION WITH ATTENTION MECHANISM AND GATED CONVOLUTIONAL NETWORKS

BACKGROUND

1. Field

The present disclosure relates to methods and apparatuses for performing speech recognition, particularly, permutation invariant training for multi-talker speech recognition with attention mechanism.

2. Description of the Related Art

In related art, many attempts have been made to address a "label ambiguity" or a "label permutation" problem in a speech recognition scenario where multiple talkers speak at the same time and only a single channel of mixed speech is available. However, the results have been unsatisfactory. For instance, Non-patent Literature (NPL) document 1 describes a deep learning model to recognize the mixed speech directly by assigning the senone labels of the talkers according to the energy of the speech. To deal with the speaker switch problem, NPL document 1 describes using a two-talker joint-decoder with a speaker switching penalty was used to trace speakers. Further, NPL document 2 describes a technique called deep clustering (DPCL) to separate the speech streams by mapping a speaker's time-frequency bins into an embedding space where the bins belong to the same speakers are close and that of different speakers are far away from each other. Moreover, NPL document 3 describes a technique called deep attractor network (DANet) which learns a high-dimensional embedding of the acoustic signals and clustered embeddings with attractor points.

Despite the progresses made in monaural multi-talker speech recognition, the word error rates (WER) reported in previous works are still much higher than that in single-talker cases. In single-talker speech recognition, speaker adaptation reduces the mismatch between the training and the test speakers and improves the WER for the test speakers.

NPL Documents

NPL document 1: Chao Weng, Dong Yu, Michael L. Seltzer, and Jasha Droppo, "Deep neural networks for single-channel multi-talker speech recognition," TASLP, vol. 23, no. 10, pp. 1670-1679, 2015.

NPL document 2: J. R. Hershey, Z. Chen, J. Le Roux, and S. Watanabe, "Deep clustering: Discriminative embeddings for segmentation and separation," in ICASSP, 2016, pp. 31-35.

NPL document 3: Zhuo Chen, Yi Luo, and Nima Mesgarani, "Deep attractor network for single-microphone speaker separation," in ICASSP, 2017, pp. 246-250.

SUMMARY

Provided are methods of performing adaptive permutation invariant training for monaural multi-talker speech recognition with attention mechanism, and apparatuses for performing the same.

According to one or more embodiments of the disclosure, there is provided a method of performing speech recognition training performed by at least one processor, the method comprising: acquiring, by the at least one processor, multi-talker mixed speech sequence data corresponding to a plurality of speakers; encoding, by the at least one processor, the multi-speaker mixed speech sequence data into an embedded sequence data; generating, by the at least one processor, speaker specific context vectors at each frame based on the embedded sequence; generating, by the at least one processor, senone posteriors for each of the speaker based on the speaker specific context vectors; and updating, by the at least one processor, an acoustic model by performing permutation invariant training (PIT) model training based on the senone posteriors.

The encoding the multi-speaker mixed speech sequence data into the embedded sequence data may comprise: performing a gated convolution operation on the multi-speaker mixed speech sequence data to generate the embedded sequence data.

The gated convolution operation maybe defined as: $h(X) = (X*W+b) \oplus \sigma(X*V+d)$, where $*$ is the convolution operator, $\sigma$ is the sigmoid function, W and V are weight parameters, b and d are biases, and $\oplus$ is the element-wise product between matrices.

The generating the speaker specific context vectors at each frame based on the embedded sequence may comprise: obtaining an attention vector based on the embedded sequence for each speaker; and determining a context vector based on the attention vector for each speaker.

The attention vector may be obtained by comparing a previously hidden state $S^i_{t-1}$ with each encoded embedding vector in the embedded sequence as follows:

$$\alpha^i_t(k) = \text{Attend}(s^i_{t-1}, h_k)$$
$$= \frac{\exp(\text{score}(s^i_{t-1}, h_k))}{\sum_j \exp(\text{score}(s^i_{t-1}, h_j))},$$

where the score is a content-based function $$\text{score}(s^i_{t-1}, h_k) = \begin{cases} s^{iT}_{t-1} W_a h_k & \text{general} \\ v^T_a \tanh(W_a[s^i_{t-1}; h_k]) & \text{concat} \end{cases},$$

where $v_a$ and $W_a$ are the learned parameters in the attention model.

The determining the context vector maybe computed as a weighted sum over each encoded embedding vector ($h_t$) in the embedded sequence with a segment size 2N+1:

$$c^i_t = \alpha^i_t(1)h_{t-N} + \ldots + \alpha^i_t(2N+1)h_{t+N}$$

The senone posterior maybe generated based on $p(o^i_t | o^i_t, \ldots, o^i_{t-1}, y_t) = g(s^i_t, c^i_t)$, where $c^i_t$ is the generated context vector, $s^i_t$ is the hidden state in the predictor for speaker i, and g is normally realized with multi-layer perceptron.

$s^i_t$ may computed as $s^i_t = \text{LSTM}(s^i_{t-1}, c^i_t)$, where LSTM is an uni-directional forward LSTM layer.

According to another embodiment, there is provided a speech recognition training apparatus comprising: at least one memory operable to store program code; and at least one processor operable to read said program code and operate as instructed by said program code, said program code comprising: acquiring code configured to acquire multi-talker mixed speech sequence data corresponding to a plurality of speakers; encoding code configured to encode the multi-speaker mixed speech sequence data into an embedded sequence data; context vector generating code, configured to generate speaker specific context vectors at each frame based on the embedded sequence; senone posterior generating code configured to generate senone posteriors for each of the speaker based on the speaker specific context vectors; and updating code configured to update an acoustic model by performing permutation invariant training (PIT) model training based on the senone posteriors.

The encoding code may be further configured to perform a gated convolution operation on the multi-speaker mixed speech sequence data to generate the embedded sequence data.

The gated convolution operation maybe defined as: $h(X) = (X*W+b) \oplus \sigma(X*V+d)$, where $*$ is the convolution operator, $\sigma$ is the sigmoid function, W and V are weight parameters, b and d are biases, and $\oplus$ is the element-wise product between matrices.

The context vector generating code maybe further configured to: obtain an attention vector based on the embedded sequence; and determine the context vector based on the attention vector.

The attention vector may be obtained by comparing a previously hidden state $S_{t-1}^{i}$ with each encoded embedding vector in the embedded sequence as follows:

$$\alpha_t^i(k) = \text{Attend}(s_{t-1}^i, h_k)$$
$$= \frac{\exp(\text{score}(s_{t-1}^i, h_k))}{\sum_j \exp(\text{score}(s_{t-1}^i, h_j))},$$

where the score is a content-based function $$\text{score}(s_{t-1}^i, h_k) = \begin{cases} s_{t-1}^{i\ T} W_a h_k & \text{general} \\ v_a^T \tanh(W_a[s_{t-1}^i; h_k]) & \text{concat} \end{cases},$$

where $v_a$ and $W_a$ are the learned parameters in the attention model.

The determining the context vector maybe computed as a weighted sum over each encoded embedding vector ($h_t$) in the embedded sequence with a segment size 2N+1:

$$c_t^i = \alpha_t^i(1)h_{t-N} + \ldots + \alpha_t^i(2N+1)h_{t+N}$$

The senone posterior maybe generated based on $p(o_t^i | o_t^i, \ldots, o_{t-1}^i, y_t) = g(s_t^i, c_t^i)$, where $c_t^i$ t is the generated context vector, $s_t^i$ is the hidden state in the predictor for speaker i, and g is normally realized with a multi-layer perceptron.

$s_t^i$ may computed as $s_t^i = \text{LSTM}(s_{t-1}^i, c_t^i)$, where LSTM is an uni-directional forward LSTM layer.

According to another embodiment, there is provided a non-transitory computer readable medium having stored thereon a program for a method of performing speech recognition, the method comprising: acquiring, by the at least one processor, multi-talker mixed speech sequence data corresponding to a plurality of speakers; encoding, by the at least one processor, the multi-speaker mixed speech sequence data into an embedded sequence data; generating, by the at least one processor, speaker specific context vectors at each frame based on the embedded sequence; generating, by the at least one processor, senone posteriors for each of the speaker based on the speaker specific context vectors; and updating, by the at least one processor, an acoustic model by performing permutation invariant training (PIT) model training based on the senone posteriors.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
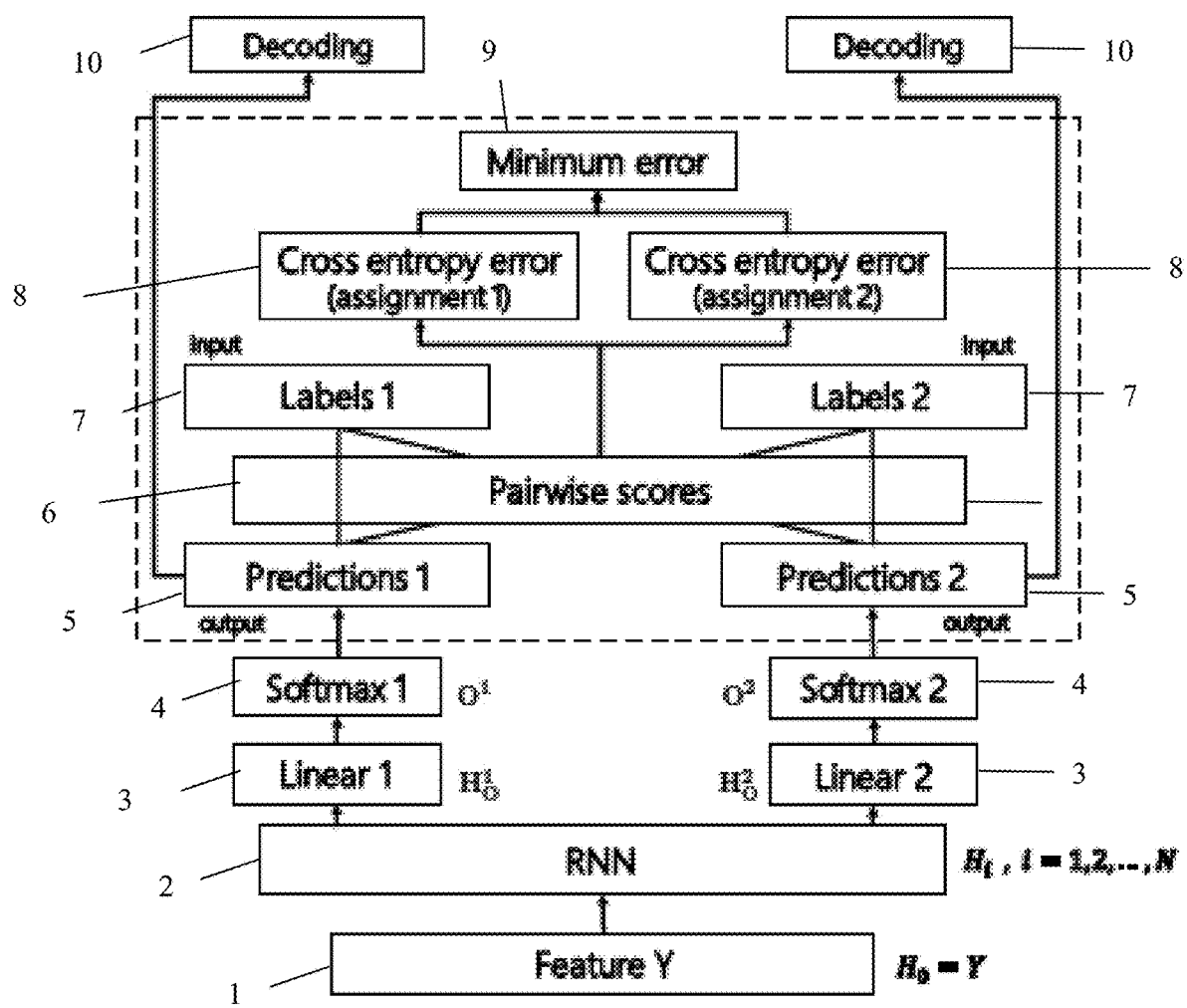
FIG. 1A is a block diagram illustrating a PIT architecture for speech recognition training.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, PIT processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

One or more embodiments of the present disclosure may address the multi-talker speech recognition, which recognize the multi-talker mixed overlap speech, in the scenario, such as cocktail party environment or other group environment.

Figure 1B:
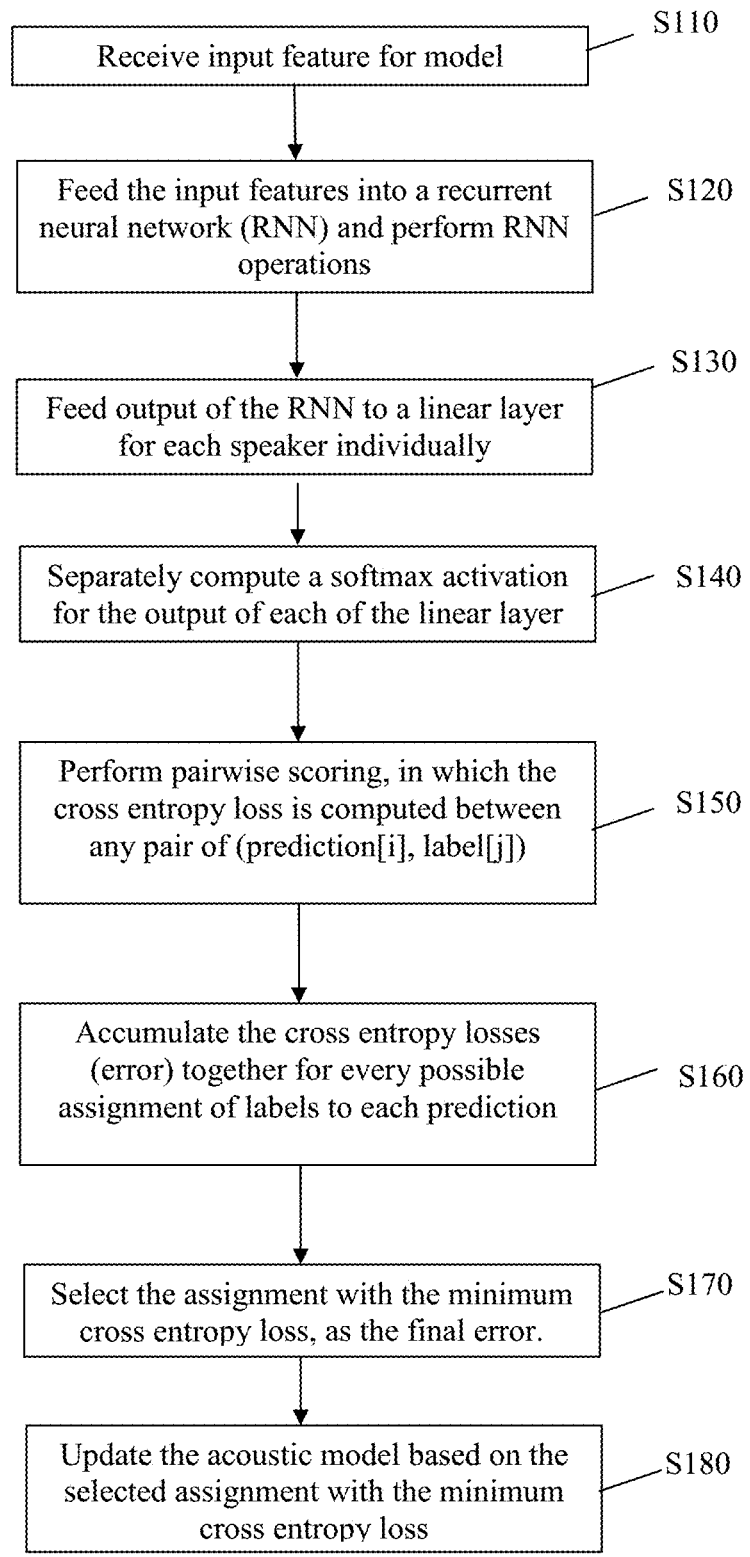
FIG. 1B is flowchart illustrating operations of a PIT architecture for speech recognition training.

Permutation invariant training (PIT) is a technique for solving the label ambiguity problem in deep learning based multi-talker speech recognition. The basic architecture of PIT for multi-talker automatic speech recognition (PIT-ASR) is depicted in FIG. 1. In this model, the mixed speech O is sent to the deep learning model to estimate the state-level posterior for each talker. For better ability of modeling long-range dependency, which can improve speaker tracing, recurrent neural networks (RNNs) are usually used. In FIGS. 1A and 1B, bidirectional long-short term memory RNNs (BLSTM-RNNs) are applied in all models.

According to PIT technique illustrated in FIG. 1A, layer 1 represents an input feature Y for the model. In layer 2, the input features are fed into a recurrent neural network (RNN) in layer 2. The RNN layer 2 may further include bidirectional long-short term memory RNNs (BLSTM-RNNs). Next, in linear layer 3, the output of the RNN layer 2 may go through linear1 and linear2 for each speaker individually. For instance, a first output of the RNN layer 2 corresponding to a first speaker may be input through a linear1 and a second output of the RNN layer 2 corresponding to a second speaker may be input through a linear2. Thereafter, the outputs from the linear layer 3, i.e., linear1 and linear2, are fed into softmax1 and softmax 2, respectively, of the softmax layer 4, which computes a softmax activation. The softmax activation may be referred to as the senone posteriori in speech recognition tasks. The output of the softmax activation in softmax1 and softmax2 may be considered as predictions1 and predictions2 in prediction layer 5.

Next, in input layer 7, label inputs for the input features Y are input as labels1 and labels2. In pairwise scoring layer 6, pairwise scoring is performed, in which the cross entropy loss is computed between any pair of (prediction[i], label[j]), where i and j may be 1, n. For instance, in illustrative FIG. 1A, the cross entropy loss may be computed between (predictions1, labels1), (predictions1, labels2), (prediction2, labels1) and (prediction2, labels2). In assignment layer 8, the cross entropy losses (error) are accumulated together for every possible assignment of labels to each prediction, which is the permutations of labels' order. For instance, in assignment1, the cross entropy losses (error) are accumulated together for every possible assignment of labels to predictions1 and in assignment2, the cross entropy losses (error) are accumulated together for every possible assignment of labels to prediction2. In layer 9, assignment, among assignment1 and assignment2, with the minimum cross entropy loss is selected as the final error. Accordingly, the model is updated based on the determined final error. Also, the prediction result from the updated model may be used for decoding an input speech data in decoding layer 10.

According to an embodiment, one or more of the layers may be implemented by one or more units or modules. Moreover, each or the one or more units or modules may be implemented by a hardware processor.

FIG. 1B illustrates a method of performing PIT model training for speech recognition training. In operation S110, input feature Y for the model for is received. The input feature may be input feature maps. In operation S120, the input features are fed into a recurrent neural network (RNN) and RNN operations are performed. The RNN operations may further include BLSTM-RNN operations. Next, in operation S130, the output of the RNN operations fed through a linear layer for each speaker individually. Thereafter, in operation S140, softmax activations are separately computed on the outputs from the linear layer.

In operation S150, pairwise scoring is performed, in which, cross entropy loss is computed between any pair of (prediction[i], label[j]), label inputs for the input features Y are input as labels1 and labels2 and the output of the softmax activation in softmax1 and softmax2 may be considered as predictions1 and predictions2. For instance, in illustrative FIG. 1A, the cross entropy loss may be computed between (predictions1, labels1), (predictions1, labels2), (prediction2, labels1) and (prediction2, labels2).

In operation S160, the cross entropy losses (error) are accumulated together for every possible assignment of labels to each prediction, which is the permutations of labels' orders. For instance, in assignment1, the cross entropy losses (error) are accumulated together for every possible assignment of labels to predictions1 and in assignment2, the cross entropy losses (error) are accumulated together for every possible assignment of labels to prediction2.

In operation S170, assignment, among assignment1 and assignment2, with the minimum cross entropy loss is selected as the final error, and in operation S180, the model is updated based on the determined final error.

One of the key ingredients in PIT is its training criterion and the objective function in PIT is defined as $$J = \frac{1}{S} \min_{s' \in permu(S)} \sum_s \sum_t CE(l_{t\,s'}^{s'}, y_t^s), \quad (1)$$

where s is a permutation of [1, 2, . . . , S], $l^s$ be the ground truth alignment, $y^s$ be estimated state-posterior of stream s, $l_{t\,s'}^{s'}$ is the ground truth label of stream $s'_s$ at frame t. PIT aims to minimize the minimal average cross entropy (CE) of the whole utterance among all possible assignments of the reference to the estimated posterior.

With this criterion, the network can automatically estimate the assignment. The CE is computed over the whole utterance so that all frames that belong to the same speaker are forced to be aligned with the same output segment (or branch). In particular, since PIT calculates the errors of all the possible assignment and chooses the minimum one (which is the most appropriate assignment), the PIT is able to automatically find the appropriate assignment.

Moreover, compared to Deep clustering (DPLC) or DANet, the PIT structure in FIG. 1A is much simpler since it allows direct multi-talker mixed speech recognition without explicit separation. After the PIT model training, the individual output posterior stream can be used for decoding as normal to obtain the final recognition result.

Although the PIT framework has been used for single-channel multi-talker speech recognition, the accuracy of speech recognition is far from the accuracy of the normal single-talker ASR scenario.

One or more embodiments of the present disclosure provide techniques and technologies that improve system performance for single-channel multi-talker speech recognition. According to one or more embodiments, adaptation technologies are integrated into the PIT framework. More specifically, auxiliary features assisted adaptation techniques are developed, including using pitch and i-vector as an additional feature in the model input, and using gender information with multi-task learning which jointly optimizes for the speech recognition and speaker-pair prediction. Moreover, according to one or more embodiments, the BLSTM-RNNs used in the PIT-ASR model may be replaced with the CNN-BLSTM structure to achieve a better system performance. Accordingly, the one or more embodiments of the present disclosure may recognize the multi-talker mixed speech with a more robust performance.

Figure 2:
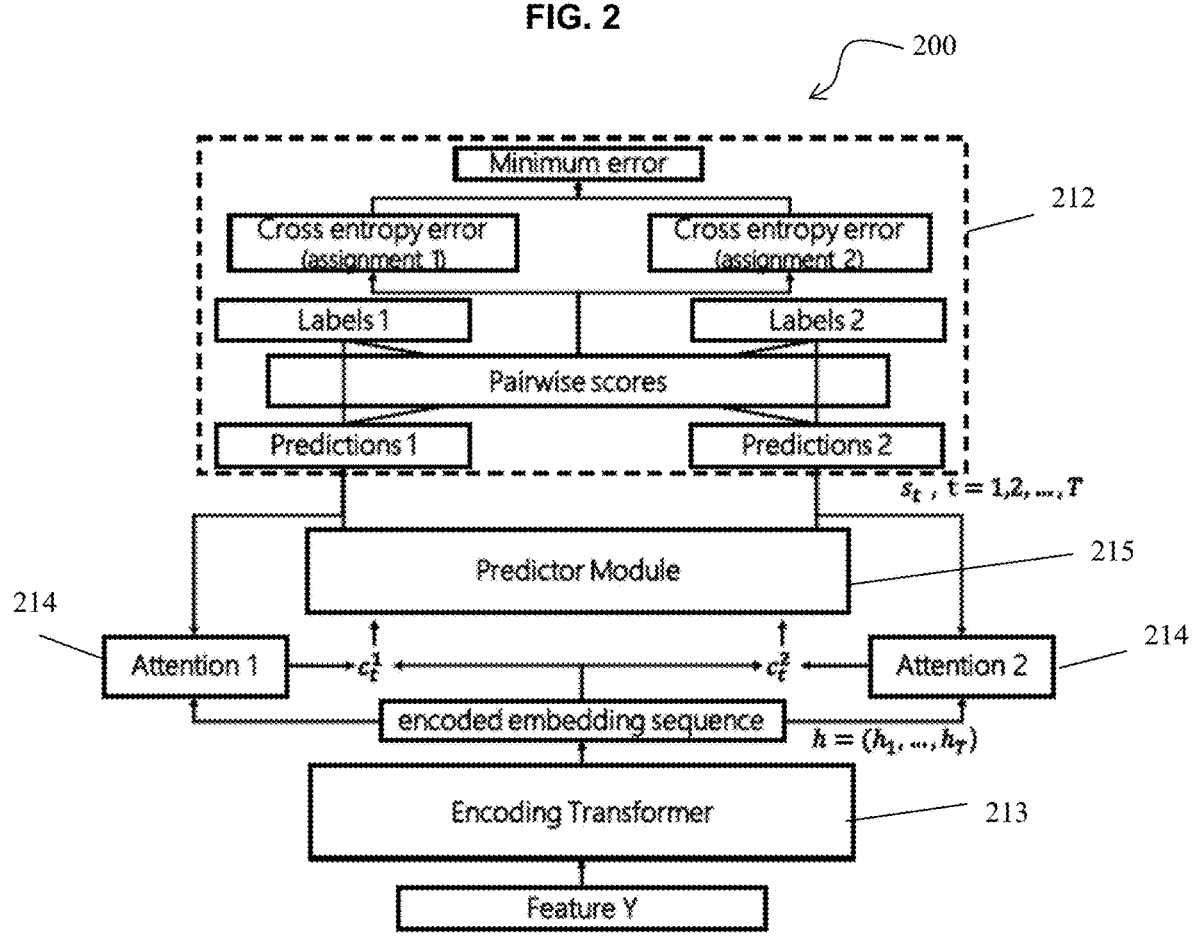
FIG. 2 is a block diagram illustrating a PIT architecture with attention mechanism according to an embodiment.

FIG. 2 is a block diagram illustrating a permutation invariant training architecture 200 with attention mechanism according to an embodiment. The PIT architecture 200 may include a PIT feature 212, an encoding transformer feature 213, an attention feature 214 and a predictor feature 215.

In the related PIT architecture without attention mechanism, the inference analysis is performed based on the information of the previous and future time steps that are implicitly encoded using the bidirectional-LSTM, and most importantly, the current time step information. In this manner, the information of each speaker in the bidirectional-LSTM are the same, which leads to great difficulties in recognizing the texts.

In contrast, the PIT architecture 200 with attention mechanism as illustrated in FIG. 2, extracts the speech information individually for each speaker, thus providing the decoder with more discriminative information. In many of the speech frames, a speaker's speech may not have the dominate energy, thus it is relatively difficult to separate the speakers. However, since each phone lasts for a few frames in the speech, context frames can be leveraged to get compensation information by computing weights. These weights can also help to eliminate the interference from other speakers and assist the model to keep track on the same speaker of the recognition in the last time step. Moreover, according to an embodiment, the encoder and decoder are the same for every speaker, and thus the attention mechanism does not add a evident complexity to the whole model.

According to an embodiment, one or more of the encoding transformer feature 213, the attention feature 214 and the predictor feature 215 provide the attention mechanism.

Figure 4:
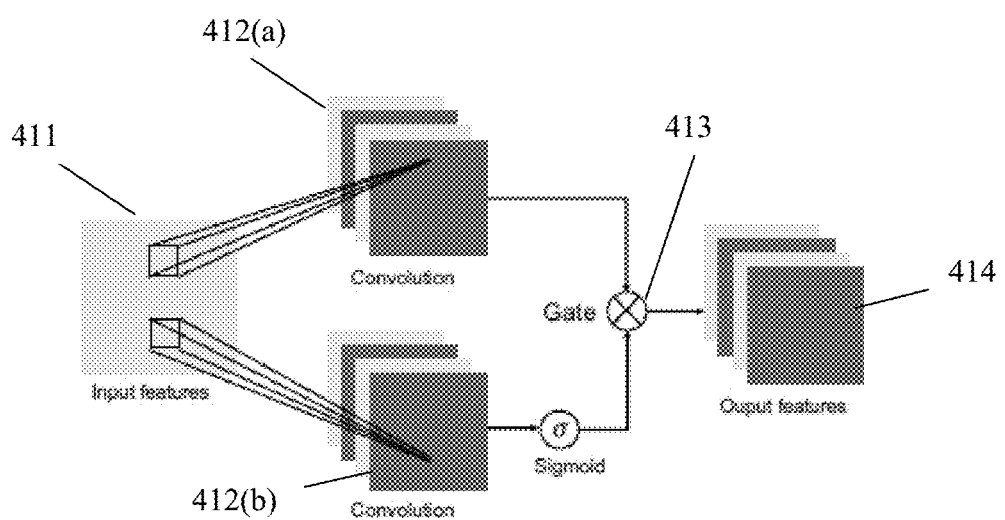
FIG. 4 is a block diagram illustrating a GCN structure according to an embodiment.

The encoding transformer 213, as further illustrated in FIG. 4, is described herein according to an embodiment. The encoding transformer feature 213, uses gated convolutional neural networks (GCN) to process input spectrum features sequence into the embedding sequence. For instance, the input spectrum feature $y_t$ is fed into a deep model and turned into the corresponding encoded embedding vector $h_t$ at each time step.

In related art techniques, several stacked BLSTM-RNN layers are used as the encoding network, in which the encoded embedding vector $h_t$ is computed as:

$$h_t^f = \text{LSTM}^f(y_t), t=1,\ldots,T \quad (2)$$

$$h_t^b = \text{LSTM}^b(y_t), t=1,\ldots,T \quad (3)$$

$$h_t = \text{Stack}(h_t^f, h_t^b) \quad (4)$$

where $\text{LSTM}^f$ and $\text{LSTM}^b$ are the forward and backward LSTMs respectively.

In contrast, according to an embodiment, some BLSTM-RNN layers of the encoding transformer may be replaced with convolutional layers and GCN. Accordingly, as illustrated according to an embodiment in FIG. 4, given a input X, the gated convolutional layer is defined as:

$$h(X) = (X*W+b) \oplus \sigma(X*V+d) \quad (5),$$

where * is the convolution operator, σ is the sigmoid function, W and V are weight parameters, b and d are biases, and ⊕ is the element-wise product between matrices. Here, GCN replaces the direct non-linear activation function in the related art convolutional neural network (CNN) with the gated linear units, which provides a linear path for the gradients while retaining non-linear capabilities with the sigmoid operation. As such, the gradient vanishing problem in training deep models may be relieved.

Figure 6:
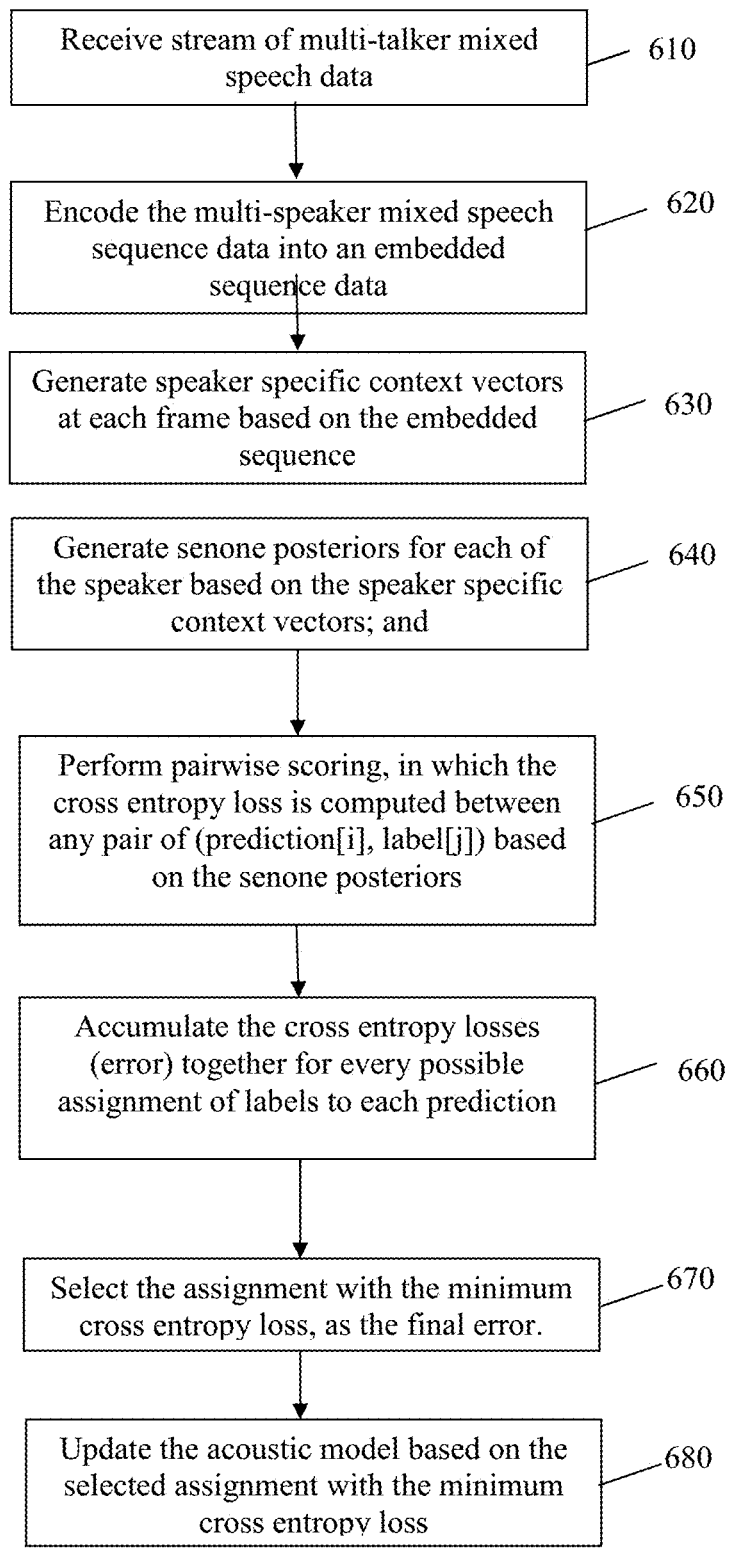
FIG. 6 is a flowchart illustrating operations of the PIT architecture with attention mechanism in FIG. 2 according to an embodiment.

Next, the attention module 214, as further illustrated in FIG. 6, is herein described according to an embodiment. While related art attention mechanism were aimed at obtaining a better alignment between the input and output sequences with different sequence lengths, the attention module 214 of the present disclosure traces each of the speakers in a multi-talker speech data and eliminates interferences by attending to the specific speech embedding sequence segment.

According to an embodiment, the attention module 214 learns an attention vector to generate speaker i specific context vectors $c_t^i$ at each frame t based on the embedding sequence. The attention vector $\alpha_t^i$ is obtained by comparing the previously hidden state $S_{t-1}^i$ with each encoded embedding vector $h_t$ as follows:

$$\alpha_t^i(k) = \text{Attend}(s_{t-1}^i, h_k) \quad (6)$$
$$= \frac{\exp(\text{score}(s_{t-1}^i, h_k))}{\sum_j \exp(\text{score}(s_{t-1}^i, h_j))},$$

where score is a content-based function $$\text{score}(s_{t-1}^i, h_k) = \begin{cases} s_{t-1}^{iT} W_a h_k & \text{general} \\ v_a^T \tanh(W_a[s_{t-1}^i; h_k]) & \text{concat} \end{cases} \quad (7)$$

where $v_a$ and $W_a$ are the learned parameters in the attention model. Thereafter, the context vector $c_t^i$ is computed as a weighted sum over the embedding vector $h_t$ with a segment size 2N+1:

$$c_t^i = \alpha_t^i(1)h_{t-N} + \ldots + \alpha_t^i(2N+1)h_{t+N} \quad (8).$$

Accordingly, the attention module 214 can help continuously attend to a specific speaker on every output by extracting context knowledge using the context vector. According to an embodiment, during the model training, all the parameters in the attention module are jointly optimized with those in other modules. Further, the attention module 214 uses local attention, which only selectively attends to a context window of input embedding sequence. More specifically, at every time t, the context vector $c_t^i$ is derived as a weighted average over a subsequence of the encoded embedding vectors within the window [t−N; t+N], where N is a hyper-parameter that represents the context window size. The attention weights for speaker i at time t is $\alpha_t^i \in \mathbb{R}^{2N+1}$.

According to an embodiment, attention vector α is obtained using the equation (6) and (7). Here, the content based function score($S_{t-1}^i$, $h_k$) is computed using the previous hidden state $S_{t-1}^i$ and each one of the time steps in the embedding sequence $h_k$. According to an embodiment, the content based function score($S_{t-1}^i$, $h_k$) can be viewed as a similarity between $S_{t-1}^i$, $h_k$). Next, a sequence of score values is obtained. According to an embodiment, for every $S_{t-1}^i$, only the score on a small segment of the embedding sequence may be compute. Therefore, the score values are normalized using a softmax function shown in (6).

According to an embodiment, hidden state $S_{t-1}^i$ is the output vector of the decoder at time step (t−1) for speaker i. Here speaker i may be the input to the decoder computed using the i-th attention structure. Further, the encoded embedding vector $h_t$ is the t-th time step in the embedding sequence.

According to an embodiment, Attend($S_{t-1}^i$, $h_k$) is computed as the lower part in equation (6), meaning the k-th attention weights at t-th time step in prediction for speaker i, namely $\alpha_t^i(k)$. To compute the attention weight $\alpha_t^i(k)$, $S_{t-1}^i$, $h_k$ are used.

Furthermore, $\exp(\text{score}(s_{t-1}^i, h_k))$ and $\Sigma_{j'} \exp(\text{score}(s_{t-1}^i, h_{j'}))$ are normal operations in softmax function. $\exp(x)$ is e to the power of x, where e is the Euler's number.

According to an embodiment, the score function may be calculated by $\Sigma_j \exp(\text{score}(s_{t-1}^i, h_j)), s_{t-1}^i{}^T W_a h_k$ or by $v_a^T \tan h(W_a[s_{t-1}^i; h_k])$concat, where W_α and v_α are parameters used in the computation and tan h is a activation function.

Next, a predictor module 215 according to an embodiment of the disclosure is described. The predictor module 215 takes the learned context vectors $c_t^i$ as input and generates the senone posteriors for each speech source i as the output.

According to an embodiment, at time step t, the senone posterior probability for speaker i is defined as:

$$p(o_t^i | o_1^i, \ldots, o_{t-1}^i, y_t) = g(s_t^i, c_t^i) \quad (9),$$

where $c_t^i$ and $s_t^i$ are the generated context vectors from the attention model and the hidden state in the predictor for speaker i, and g is normally realized with a multi-layer perceptron (MLP), which is a fully connected layer according to an embodiment.

According to an embodiment, the posterior possibility of speaker i at time step t is defined as $p(o_t^i | o_1^i, \ldots, o_{t-1}^i, y_t)$, meaning that the senone posterior of speaker i at time step t is dependent on the current input and previous senone states. Furthermore, $g(s_t^i, c_t^i)$ is the MLP function. Accordingly, senone posteriors are obtained using an MLP, whose input are hidden state $s_t^i$ and attention context $c_t^i$.

Here, referring to the operation of Wx+b, where x is the concatenation of the output from decoder and the context vector of attention mechanism. If the dimension of x is denoted to be $d^{in}$ and the output dimension of MLP to be $d^{out}$, then W is a parameter matrix of dimension $d^{out} \times d^{in}$ and b is the bias of dimension $d^{out}$.

Moreover, $s_t^i$ is computed as:

$$s_t^i = \text{LSTM}(s_{t-1}^i, c_t^i) \quad (10)$$

where LSTM is the uni-directional forward LSTM layer.

For speaker i, the decoder may compute the hidden state $s_t^i$ at every time step t and the input is $s_{t-1}^i, c_t^i$. According to an embodiment, the decoder maybe an LSTM.

According to an embodiment, as shown in FIG. 2, after the input features are encoded by the encoding transformer features 213, two separate attention streams are constructed individually to get the context vector for each speaker respectively. The two separate attention streams may be constructed by the attention module 214. Then the individual context vectors $c_t^i$ of each speaker are fed into the predictor module 215 to generate the frame-level senone posterior stream. According to an embodiment, the two separate context vectors $c_t^i$ are fed into a single predictor module 215. As such, the PIT-ASR model is optimized by using the attention mechanism.

Figure 3:
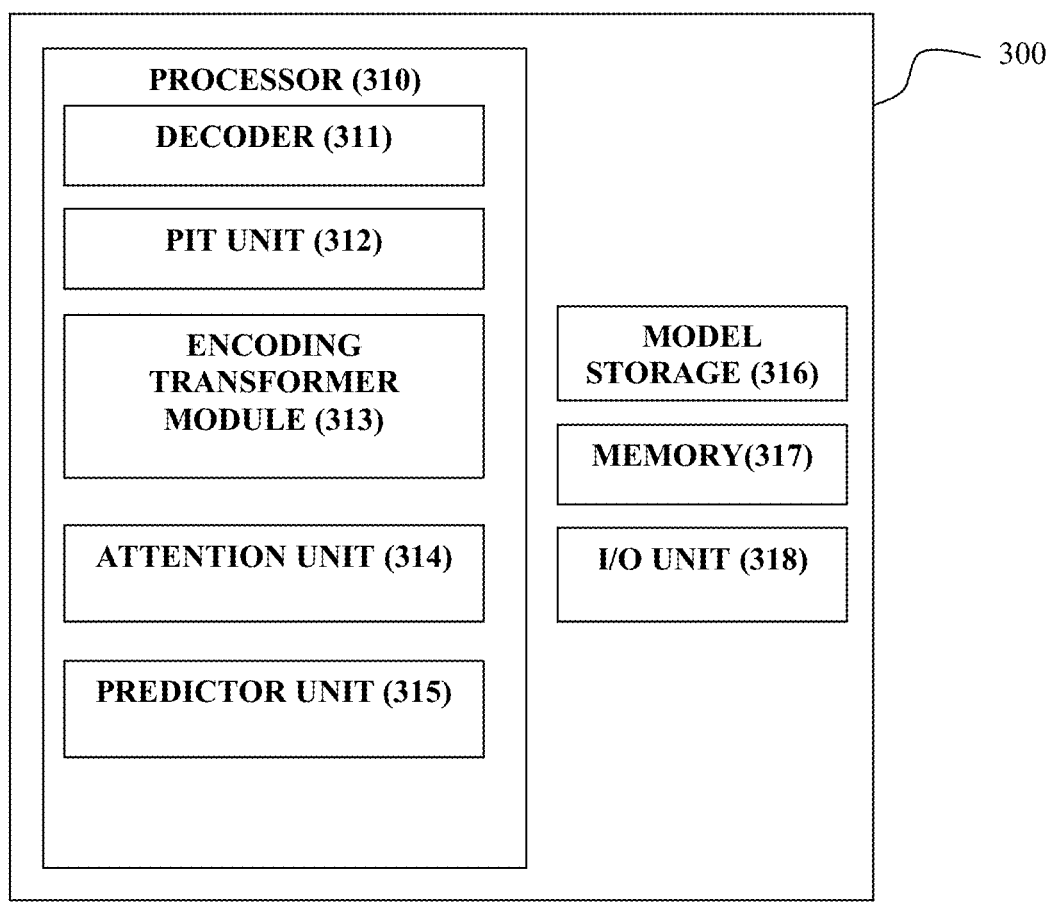
FIG. 3 is an apparatus implementing the PIT architecture with attention mechanism in FIG. 2 according to an embodiment.

FIG. 3 shows an apparatus 300 implementing the permutation invariant training architecture 200 with attention mechanism according to an embodiment. The apparatus 300 may include a processor 310, model storage 316, memory 317 and input/output unit 318. According to an embodiment, the processor 310 may be further configured to implement a decoder 311, a PIT unit 312, a encoding transformer unit 313, an attention unit 314 and a predictor unit 315. According to another embodiment, the processor 310 may not implement all of the decoder 311, the PIT unit 312, the encoding transformer unit 313, the attention unit 314 and the predictor unit 315. According to another embodiment, instead, the encoding transformer unit 313, the attention unit 314 and the predictor unit 315.

According to an embodiment, the model storage 316 may be configured to store one or more of an acoustic model, bidirectional long-short term memory, recurrent neural networks, convolutional neural network, gated convolutional neural network and other models and networks associated with PIT.

According to an embodiment, the processor 310 may be configured to receive a stream of speech data through the I/O unit 318. According to an embodiment, the stream of speech data may include speech data from multiple speakers speaking at the same time and may further include only a single channel of mixed speech data. Also, the speech data may have structures along both time and frequency axes.

According to an embodiment, the PIT unit 312 may be configured to perform the PIT framework illustrated in FIGS. 1 and 2 and the decoder 311 may decode speech data based on the PIT model training.

According to an embodiment, the encoding transformer unit 313, as further illustrated in FIG. 4, may use gated convolutional neural networks (GCN) to process the input spectrum features sequence into the embedding sequence. For instance, the input spectrum feature $y_t$ is fed into a deep model and turned into the corresponding encoded embedding vector $h_t$ at each time step. The encoding transformer unit 313 may include a gated convolutional layer, which controls the information flow in the convolutional network as follows:

$$h(X) = (X*W + b) \oplus \sigma(X*V + d) \quad (5),$$

where * is the convolution operator, a is the sigmoid function, W and V are weight parameters, b and d are biases, and ⊕ is the element-wise product between matrices.

According to an embodiment, the GCN layer is illustrated according to an embodiment in FIG. 4. For instance, in FIG. 4, input features are extracted at 411. At 412(a) and 412(b), convolution operation is performed on the extracted input features. At 413, a gating mechanism is employed to control specific information from the convolution operation to flow through the neural network as output feature 414.

Specifically, element 411 illustrates the input feature of each layer, and convolutional operations are performed on the input features by convolutional filters (the small rectangles in 411). Each result of the convolutional operation are one element in 412(a) and 412 (b). Thereafter, the sigmoid function is applied on each element of the convolution result in 412(b). Finally, the convolutional result 412(a) and the result of sigmoid function are element-wisely multiplicated at 413 to produce the output 414 of each GCN layer.

According to an embodiment, the GCN computation is done on the input frames at each time step, namely every frame of input will produce an embedding. Thereafter, the embedding of every input frame are accumulated together to form the embedding sequence. The embedding and the hidden state both represent the output of neural network layers. However, for clarity, the term embedding is used to represent the output of the encoder and the hidden state is used to represent the output of the decoder.

According to another embodiment, the encoding transformer unit 313 may utilize a CNN layer, instead of the GCN layer for generating the encoded embedding vector. According to yet another embodiment, the encoding transformer unit 313 may utilize stacked BLSTM-RNN layers for generating the encoded embedding vector.

According to embodiment, the attention unit 314 may be configured to learn an attention vector from the embedded vector to generate speaker i specific context vectors $c_t^i$ at each frame t. The attention vector $\alpha_t^i$ is obtained by comparing the previously hidden state $S^i_{t-1}$ with each encoded embedding vector $h_t$ as follows:

$$\alpha^i_t(k) = \text{Attend}(s^i_{t-1}, h_k) \quad (6)$$

$$= \frac{\exp(\text{score}(s^i_{t-1}, h_k))}{\sum_j \exp(\text{score}(s^i_{t-1}, h_j))},$$

where score is a content-based function $$\text{score}(s^i_{t-1}, h_k) = \begin{cases} s^{iT}_{t-1} W_a h_k & \text{general} \\ v^T_a \tanh(W_a[s^i_{t-1}; h_k]) & \text{concat} \end{cases}, \quad (7)$$

where $v_a$ and $W_a$ are the learned parameters in the attention model. Thereafter, the context vector $c^i_t$ is computed as a weighted sum over the embedding vector ht with a segment size 2N+1:

$$c^i_t = \alpha^i_t(1)h_{t-N} + \ldots + \alpha^i_t(2N+1)h_{t+N} \quad (8).$$

According to an embodiment, the predictor unit 315 takes the learned context vectors $c^i_t$ as input and generates the senone posteriors for each speech source i as the output. According to an embodiment, at time step t, the senone posterior probability for speaker i is defined as $$p(o^i_t | o^i_1, \ldots, o^i_{t-1}, y_t) = g(s^i_t, c^i_t) \quad (9),$$

where $c^i_t$ t and $s^i_t$ are the generated context vectors from the attention model and the hidden state in the predictor for speaker i, and g is normally realized with an MLP. Moreover, $s^i_t$ is computed as $$s^i_t = \text{LSTM}(s^i_{t-1}, c^i_t) \quad (10),$$

where LSTM is the uni-directional forward LSTM layer.

Figure 5:
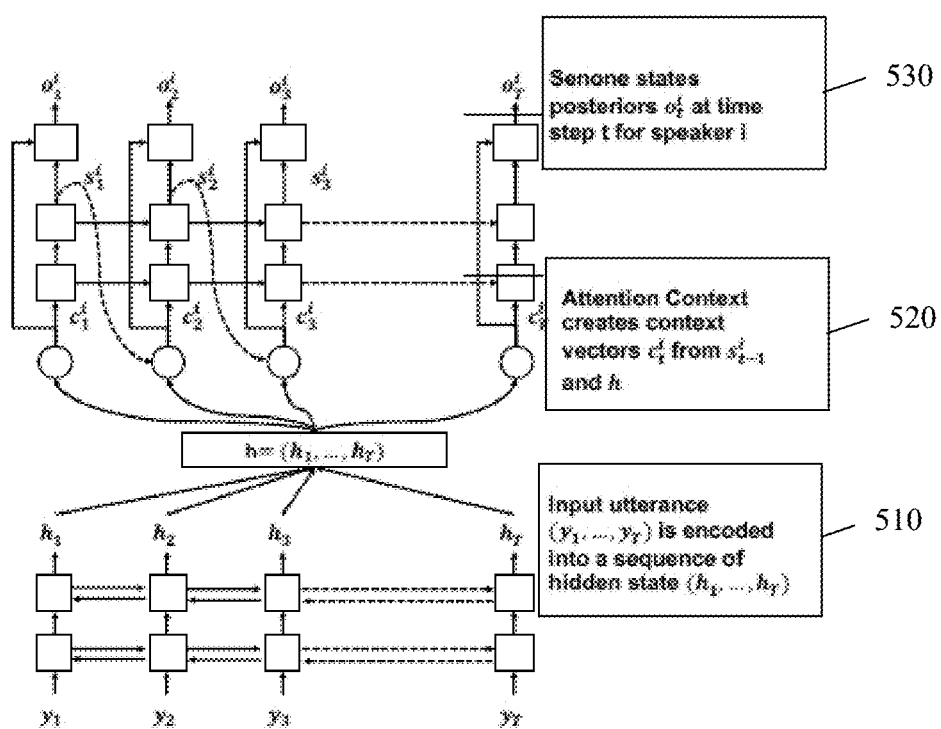
FIG. 5 is flowchart illustrating operations of the attention mechanism of FIG. 2 according to an embodiment.

FIG. 5 is flowchart illustrating operations of the attention mechanism of FIG. 2 according to an embodiment.

At S510, a processor may receive a stream of speech data and encode the speech data into a sequence of hidden state ($h_1$, $h_T$). According to an embodiment, the stream of speech data may include speech data from multiple speakers speaking at the same time and may further include only a single channel of mixed speech data.

At S520, the processor may generate context vectors based on attention vector $\alpha^i_t$ obtained by comparing the previously hidden state $S^i_{t-1}$ with each encoded embedding vector $h_t$. According to an embodiment, the attention vector $\alpha^i_t$ is obtained as follows:

$$\alpha^i_t(k) = \text{Attend}(s^i_{t-1}, h_k) \quad (6)$$

$$= \frac{\exp(\text{score}(s^i_{t-1}, h_k))}{\sum_j \exp(\text{score}(s^i_{t-1}, h_j))},$$

where score is a content-based function $$\text{score}(s^i_{t-1}, h_k) = \begin{cases} s^{iT}_{t-1} W_a h_k & \text{general} \\ v^T_a \tanh(W_a[s^i_{t-1}; h_k]) & \text{concat} \end{cases}, \quad (7)$$

where $v_a$ and $W_a$ are the learned parameters in the attention model. Thereafter, the context vector $c^i_t$ is computed as a weighted sum over the embedding vector ht with a segment size 2N+1:

$$c^i_t = \alpha^i_t(1)h_{t-N} + \ldots + \alpha^i_t(2N+1)h_{t+N} \quad (8).$$

At S530, senone posterior output are determined based context vectors. For instance, at time step t, the senone posterior probability for speaker i is defined as $$p(o^i_t | o^i_1, \ldots, o^i_{t-1}, y_t) = g(s^i_t, c^i_t) \quad (9),$$

where $c^i_t$ t and $s^i_t$ are the generated context vectors from the attention model and the hidden state in the predictor for speaker i, and g is normally realized with an MLP. Moreover, $s^i_t$ is computed as $$s^i_t = \text{LSTM}(s^i_{t-1}, c^i_t) \quad (10)$$

where LSTM is the uni-directional forward LSTM layer.

FIG. 6 is a flowchart illustrating operations of the PIT architecture with attention mechanism of FIG. 2 according to an embodiment.

At 610, a processor may receive a stream of speech data. According to an embodiment, the stream of speech data may include speech data from multiple speakers speaking at the same time and may further include only a single channel of mixed speech data. Also, the speech data may have structures along both time and frequency axes.

At 620, the processor may encode the multi-speaker mixed speech sequence data into an embedded sequence data. According to an embodiment, the processor may use GCN layers to encode the embedded sequence data.

At 630, the processor may generate speaker specific context vectors at each frame based on the embedded sequence.

At 640, the processor may generate senone posteriors for each of the speaker based on the speaker specific context vectors.

At 650, pairwise scoring is performed, in which, cross entropy loss is computed between any pair of (prediction[i], label[j]), label inputs for the input features Y are input as labels1 and labels2 and the output of the predictor may be considered as predictions1 and predictions2.

At 660. the cross entropy losses (error) are accumulated together for every possible assignment of labels to each prediction, which is the permutations of labels' orders. For instance, in assignment1, the cross entropy losses (error) are accumulated together for every possible assignment of labels to predictions1 and in assignment2, the cross entropy losses (error) are accumulated together for every possible assignment of labels to prediction2.

At 670, assignment, among assignment1 and assignment2, with the minimum cross entropy loss is selected as the final error, and at 680, the model is updated based on the determined final error.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

To evaluate the PIT architecture 200 with attention mechanism of FIG. 2, a baseline normal PIT-ASR system as illustrated in FIGS. 1A and 1B is constructed. The baseline normal PIT-ASR system has a 6-layer BLSTM-RNN model with 384 memory cells in each layer 1. The output of the last BLSTM layer is sent directly to two output layers with softmax activation, representing two recognition streams. These two outputs are then used in decoding to obtain the hypotheses for two talkers. The averaged WER on two talkers of the baseline is shown as the first line in Table 1.

Evaluation on the Gated CNN

In this scenario, some of the BLSTM layers at the bottom of the baseline PIT-ASR model are replaced with the convolutional layers. The CNN layer is utilized and the depth of CNN layers is increased from 2 to 6 (from a shallow CNN to a deep CNN). The results are shown in the middle part of Table 1. It is observed that using CNN layers in PIT-ASR can get obvious improvements. Moreover, as shown in Table 1, increasing convolutional layer depth brings further gains.

Next, some of the BLSTM layers at the bottom of the baseline PIT-ASR model are replaced with gated convolutional layers (GCN), such that the model has 2 GCN plus 4 BLSTM. The result, shown in the bottom line of Table 1, indicates that GCN-BLSTM achieved relative 12% and 6% improvements upon the 6L-BLSTM and 2L-CNN-4L-BLSTM, respectively. Even the shallow GCN-BLSTM slightly outperforms the deep CNN-BLSTM.

TABLE 1

WERs (%) of normal PIT-ASR models with different model structures

| Model | # L CNN/GCN | #L BLSTM | AVG WER |
|---|---|---|---|
| BLSTM | — | 6 BLSTM | 37.2 |
| CNN-BLSTM | 2 CNN | 4 BLSTM | 34.8 |
|  | 4 CNN | 4 BLSTM | 33.5 |
|  | 6 CNN | 4 BLSTM | 32.9 |
| GCN-BLSIM | 2 CNN | 4 BLSTM | 32.7 |

Evaluation on the Attention Mechanism

In this scenario, the PIT system with attention mechanism has a encoding transformer that is a 3-layer BLSTM and a predictor module that is a 3-layer LSTM with 384 cells per layer. The context size used in the attention model is set to 10. Two scoring methods in the attention model, i.e. "general" and "concat" shown in equation 7, are compared and the results are listed in Table. 2. Here, PIT architecture with attention mechanism of FIG. 2, is significantly better than the baseline normal PIT-ASR for multi-talker speech recognition of FIG. 1.

For the different scoring modes in the attention module, the "concat" outperforms the "general". The "concat" scoring method is utilized in all the following evaluations discussed below.

TABLE 2

WERs (%) of the attention-based PIT-ASR models with different score methods in the attention module

| Model | Score Method | AVG WER |
|---|---|---|
| PIT-ASR | — | 37.2 |
| +Attention | general | 34.6 |
|  | concat | 33.1 |

Results from additional experiments were performed for the PIT-ASR system with attention mechanism of FIG. 2 are shown in Table 3 below. Different configurations with regard to the number of layers in the encoding module and the predictor module, and the context window size in the attention module were implemented and compared.

TABLE 3

WERs (%) of the attention-based PIT-ASR models with different configurations in the model architecture, including the number of BLSTM layers in the encoding module (#L Enc), the number of LSTM layers in the predictor module (#L Pred) and the context window size in the attention module (#N Ctx)

| Model | #L Enc | #L Pred | #N Ctx | AVG WER |
|---|---|---|---|---|
| PIT-ASR | — | — | — | 37.2 |
| +Attention | 3 | 3 | 5 | 34.6 |
|  | 3 | 3 | 10 | 33.1 |
|  | 3 | 3 | 15 | 32.4 |
|  | 4 | 2 | 10 | 32.6 |
|  | 5 | 1 | 10 | 32.3 |
|  | 4 | 2 | 15 | 31.0 |

Several observations can be made: 1) The larger the context window in the attention model, the better the performance, since attending on longer embedding sequence can generate more accurate context vectors. 2) When keeping the total number of layers unchanged in the proposed model (with the comparable model scale), more layers in the encoding transformer can produce better embedding representations and thus better performing system. 3) The system with both larger context window and deeper encoding module performs best and achieves relative 17% error reduction compared to the baseline PIT architecture.

Evaluation of the Integrated System

In this scenario, an integrated system having the GCN and the attention-based PIT-ASR model of FIG. 2 is evaluated. Based on the 4th line of Attention configurations in Table 3, i.e. 4-layer BLSTM and 2-layer LSTM in the encoder and predictor respectively with the context size 10, two BLSTM layers in encoding module are replaced with two Gated CNN layers, and others are kept the same. The system performance comparison is illustrated in Table 4. It is observed that incorporating gated convolutional networks enables the encoding module to generate better embedding which achieves another gain upon the attention-based PIT-ASR system.

TABLE 4

| WERs (%) comparison of the integrated systems | | | |
|---|---|---|---|
| Model | Attention | GCN | AVG WER |
| PIT-ASR | — | — | 37.2 |
| +Attn | ✓ | — | 32.6 |
| +Attn + GCN | ✓ | ✓ | 31.6 |

As stated above, the PIT-ASR system with attention mechanism improves on the baseline normal PIT-ASR system by providing tracing speakers better and eliminating interferences by attending on the embedding sequence segments. This is further illustrated in FIG. 7, which shows a statistics on the attention weights $\alpha^i_t$, and measure the difference between $\alpha^i_t$ for the individual speakers i at time step t. The angle difference θ based on the cosine-distance is used:

$$\theta(\alpha^1_t, \alpha^2_t) = \arccos \frac{\alpha^1_t \cdot \alpha^2_t}{\|\alpha^1_t\| \|\alpha^2_t\|} \quad (11)$$

Figure 7:
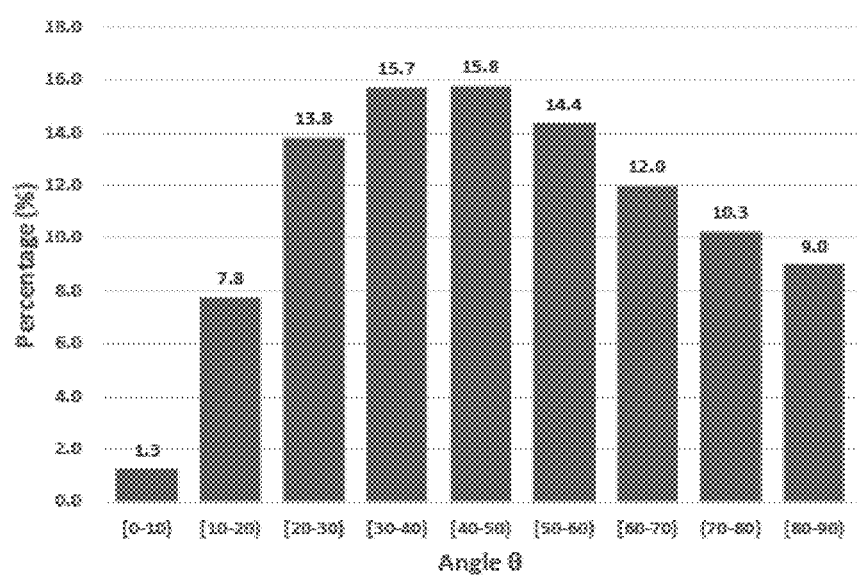
FIG. 7 is a graph illustrating a distribution from statistics performed on an evaluation set applied to the PIT architecture with attention mechanism in FIG. 2 according to an embodiment.

A larger angle difference, approaching 90, indicates the better discrimination between the speakers with attentions, and vice versa. FIG. 7 shows the distribution from statistics performed on the evaluation set. It shows that only a very small part is with close similarity, around 1% with less than 10, and a large portion of the distance between the attentions is over 50. The average distance of attentions between speakers on the open-set evaluation is 50, which indicates the potential ability on speaker tracing and interference elimination from the proposed new architecture for multi-talker speech recognition.

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing speech recognition training performed by at least one processor, the method comprising:

acquiring, by the at least one processor, multi-speaker mixed speech sequence data corresponding to a plurality of speakers;

encoding, by the at least one processor, the multi-speaker mixed speech sequence data into an embedded sequence data;

generating, by the at least one processor, speaker specific context vectors at each frame based on the embedded sequence;

generating, by the at least one processor, senone posteriors for each of the speaker based on the speaker specific context vectors; and updating, by the at least one processor, an acoustic model by performing permutation invariant training (PIT) model training based on the senone posteriors.

2. The method of claim 1, wherein the encoding the multi-speaker mixed speech sequence data into the embedded sequence data comprises:

performing a gated convolution operation on the multi-speaker mixed speech sequence data to generate the embedded sequence data.

3. The method of claim 2, wherein the gated convolution operation is defined as: $h(X)=(X*W+b)\oplus\sigma(X*V+d)$, where $*$ is the convolution operator, σ is a sigmoid function, W and V are weight parameters, b and d are biases, and ⊕ is element-wise product between matrices.

4. The method of claim 1, wherein the generating the speaker specific context vectors at each frame based on the embedded sequence comprises:

obtaining an attention vector based on the embedded sequence for each speaker; and determining a context vector based on the attention vector for each speaker.

5. The method of claim 4, wherein the attention vector is obtained by comparing a previously hidden state $S^i_{t-1}$ with each encoded embedding vector in the embedded sequence as follows:

$$\alpha^i_t(k) = \text{Attend}(s^i_{t-1}, h_k)$$
$$= \frac{\exp(\text{score}(s^i_{t-1}, h_k))}{\sum_j \exp(\text{score}(s^i_{t-1}, h_j))}$$

where the score is a content-based function $$\text{score}(s^i_{t-1}, h_k) = \begin{cases} s^{iT}_{t-1} W_a h_k & \text{general} \\ v_a^T \tanh(W_a[s^i_{t-1}; h_k]) & \text{concat} \end{cases}$$

where $v_a$ and $W_a$ are learned parameters in attention model.

6. The method of claim 4, wherein the determining the context vector is computed as a weighted sum over each encoded embedding vector ($h_t$) in the embedded sequence with a segment size 2N+1:

$$c^i_t = \alpha^i_t(1)h_{t-N} + \ldots + \alpha^i_t(2N+1)h_{t+N}.$$

7. The method of claim 5, wherein the senone posterior is generated based on $p(o^i_t|o^i_1, \ldots, o^i_{t-1}, y_t) = g(s^i_t, c^i_t)$, where $c^i_t$ is the generated context vector, $s^i_t$ is the hidden state in a predictor for speaker i, and g is normally realized with an MLP.

8. The method of claim 7, wherein $s^i_t$ is computed as where LSTM is an uni-directional forward LSTM layer.

9. A speech recognition training apparatus comprising:
at least one memory operable to store program code; and
at least one processor operable to read said program code and operate as instructed by said program code, said program code comprising:
- acquiring code configured to acquire multi-speaker mixed speech sequence data corresponding to a plurality of speakers;
- encoding code configured to encode the multi-speaker mixed speech sequence data into an embedded sequence data;
- context vector generating code, configured to generate speaker specific context vectors at each frame based on the embedded sequence;
- senone posterior generating code configured to generate senone posteriors for each of the speaker based on the speaker specific context vectors; and
- updating code configured to update an acoustic model by performing permutation invariant training (PIT) model training based on the senone posteriors.

10. The speech recognition training apparatus of claim 9, wherein the encoding code is further configured to perform a gated convolution operation on the multi-speaker mixed speech sequence data to generate the embedded sequence data.

11. The speech recognition training apparatus of claim 10, wherein the gated convolution operation is defined as:

$$h(X) = (X*W+b) \oplus \sigma(X*V+d),$$

where $*$ is the convolution operator, $\sigma$ is a sigmoid function, W and V are weight parameters, b and d are biases, and $\oplus$ is element-wise product between matrices.

12. The speech recognition training apparatus of claim 10, wherein the context vector generating code is further configured to:
- obtain an attention vector based on the embedded sequence for each speaker; and
- determine a context vector based on the attention vector for each speaker.

13. The speech recognition training apparatus of claim 12, wherein the attention vector is obtained by comparing a previously hidden state $S^i_{t-1}$ with each encoded embedding vector in the embedded sequence as follows:

$$\alpha_t^i(k) = \text{Attend}(s_{t-1}^i, h_k)$$

$$= \frac{\exp(\text{score}(s_{t-1}^i, h_k))}{\sum_j \exp(\text{score}(s_{t-1}^i, h_j))}$$

where the score is a content-based function $$\text{score}(s_{t-1}^i, h_k) = \begin{cases} s_{t-1}^{i\,T} W_a h_k & \text{general} \\ v_a^T \tanh(W_a[s_{t-1}^i; h_k]) & \text{concat} \end{cases}$$

where $v_a$ and $W_a$ are learned parameters in attention model.

14. The speech recognition training apparatus of claim 12, wherein the determining the context vector is computed as a weighted sum over each encoded embedding vector ($h_t$) in the embedded sequence with a segment size 2N+1:

$$c_t^i = \alpha_t^i(1)h_{t-N} + \ldots + \alpha_t^i(2N+1)h_{t+N}.$$

15. The speech recognition training apparatus of claim 10, wherein the senone posterior is generated based on $p(o_t^i | o_1^i, \ldots, o_{t-1}^i, y_t) = g(s_t^i, c_t^i)$, where $c_t^i$ t is the generated context vector, $s_t^i$ is a hidden state in a predictor for speaker i, and g is normally realized with an MLP.

16. The speech recognition training apparatus of claim 15, wherein $s_t^i$ is computed as $s_t^i = \text{LSTM}(s_{t-1}^i, c_t^i)$, where LSTM is an uni-directional forward LSTM layer.

17. A non-transitory computer readable medium having stored thereon a program for a method of performing speech recognition, the method comprising:
- acquiring multi-speaker mixed speech sequence data corresponding to a plurality of speakers;
- encoding the multi-speaker mixed speech sequence data into an embedded sequence data;
- generating speaker specific context vectors at each frame based on the embedded sequence;
- generating senone posteriors for each of the speaker based on the speaker specific context vectors; and
- updating an acoustic model by performing permutation invariant training (PIT) model training based on the senone posteriors.

* * * * *